April 28, 1970  M. E. WEBSTER  3,508,689

VALVE FOR PRESSURIZED CONTAINER

Filed Oct. 10, 1967

United States Patent Office 3,508,689
Patented Apr. 28, 1970

3,508,689
VALVE FOR PRESSURIZED CONTAINER
Milo Edward Webster, Braintree, Mass., assignor to The Gillette Company, Boston, Mass., a corporation of Delaware
Filed Oct. 10, 1967, Ser. No. 674,160
Int. Cl. B65d 83/00
U.S. Cl. 222—402.24                11 Claims

ABSTRACT OF THE DISCLOSURE

An integral valve member having a radially extending central body portion with a sealing lip on the upper side thereof, an outer, annular, support portion normally in a plane below the upper side, and a thin walled, resilient, annular channel of U-shaped cross section, integral with the body and support portions extending away from said upper side for providing a biasing effect on relative movement of the body and support portions; and said valve member in a pressurized fluid container assembly with said support and body portions in a common plane thereby deforming said channel to bias said lip against a seal.

SUMMARY OF INVENTION

This invention relates to an improved valve member and valve assembly for pressurized containers.

A principal object of this invention is to provide an integral, molded valve member which is self biasing and self aligning when incorporated in a pressurized container, thereby eliminating the necessity of having a metal spring which is usually subject to corrosion and which may be a source of fluid contamination. A further object of this invention is to provide a design for a valve member which will permit molding by conventional techniques of passages in the member without interference from portions of the member which after assembly in a container normally would interfere. Still another object of this invention is to provide such a member which may be integral with the valve stem to reduce numbers of parts, to simplify assembly, and to permit inexpensive manufacture and assembly. And yet another object of this invention is to provide an improved self biasing valve assembly.

In general, the invention features a valve member having a central body portion, with a valving surface on one side, and an outer support portion interconnected with the body portion by a web of generally U-shaped cross section. The web is resilient, and hence when the support and body portions are moved relative to each other, the web is deformed and exerts a return biasing effect. In a preferred embodiment the web is connected to the body and support surfaces on the opposite sides thereof from the valving surface and the support portion lies in a plane spaced toward the opposite side of the body portion from the plane of the valving surface. When the valve member is assembled in a pressurized container the web deformed to provide a biasing effect.

Figure 1:
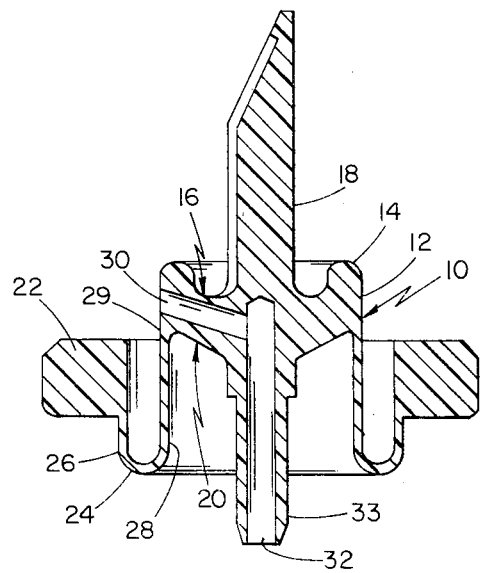
Figure 2:
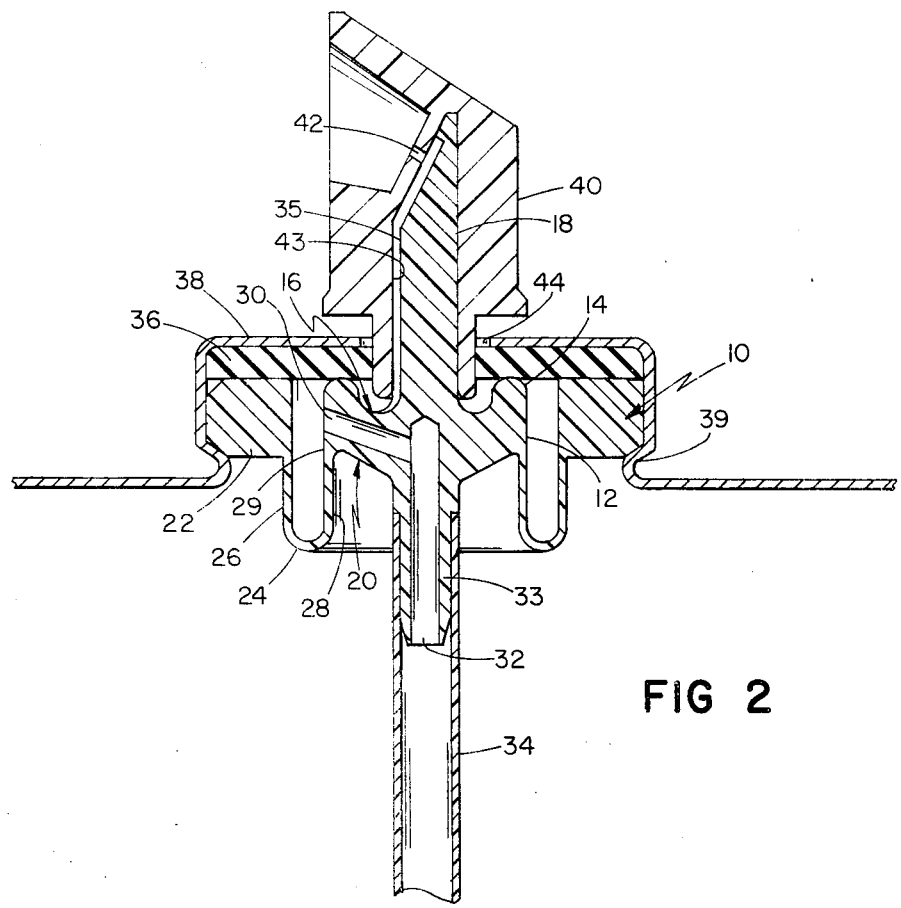

Other objects, features and advantages of this invention will be apparent to those skilled in the art from the following detailed description of a specific embodiment thereof together with the accompanying drawings, in which:

FIG. 1 is a sectional, side view of a valve member according to the invention; and, FIG. 2 is a fragmentary, sectional, side view of a valve member according to the invention assembled in a pressurized container.

DESCRIPTION OF PARTICULAR EMBODIMENT

With reference to FIG. 1, the integral valve member 10 includes a central, radially extending, body portion 12 having a raised annular sealing lip 14 on the upper side 16 thereof in a plane normal to the axis of the body portion. Axially extending from the upper side 16 of central portion 12 is coaxial valve stem 18 having a groove 35 formed along one side and in the end thereof.

Spaced radially from central body portion 12 is an outer, annular support portion 22 of relatively large cross section. Support portion 22 is in a plane offset axially from said upper side 16 of central portion 12 toward the lower side 20 thereof.

Interconnecting central body portion 12 and outer support portion 22 is an unstressed, thin walled, coaxial web 24 of U-shaped cross sectional configuration, having an inner wall portion 28 depending from the edge of the lower side 20 of central body portion 12 and having an outer wall portion 26 depending from the inner edge of outer support portion 22 walls 26, 28 positioned parallel to the axis of body portion 12, as shown in FIG. 1.

Passage 30 extends inwardly from the circumferential wall 29 of central body portion 12 and connects with axial bore 32 in stub 33 depending from the lower side 20 at a central body portion 12. Passage 30 is located in wall 29 at a position between the upper side 16 of body portion 12 and the uppermost portion of support portion 22, thus facilitating its formation either in the molding process or thereafter.

Valve member 10 is integrally molded in a conventional manner of suitable plastic material which is resilient in thin sections as in web 24. In a preferred embodiment the valve member 10 is made of polypropylene.

As shown in FIG. 2, the valve member 10 is assembled in a container 38 with stem 18 extending through an aperture 44. Sealing lip 14 is in sealing contact with resilient disc seal 36. The container wall 38 is deformed at 39 about the support portion 22 held to the upper surface of portion 22 in engagement with disc 36 so that the upper surface of portion 22 is positioned in substantially the same plane with lip 14 of central, body portion 12 thus deforming and prestressing channel 24, by lengthening wall 26 and shortening wall 28, and producing a biasing pressure urging lip 14 into sealing relation against seal 36. A dip tube 34 is attached to stub 33 of central body portion 12 in communication with bore 32. A cap 40, having an outlet orifice 42, and a bore 43 cooperates with groove 35 when positioned on stem 18 to define a discharge passage extending from central portion 12. The inherently self aligning character of valve member 10 resulting when channel 24 is deformed, properly locates valve stem 18 as the valve is assembled.

When assembled, the valve is operated by depressing cap 40 which causes disengagement of lip 14 and seal 36. The product to be dispensed, then passes through tube 34, bore 32, passage 30, web 24, over lip 14, to the discharge passage and outlet orifice 42. The biasing effect of the distorted web 24 causes return of lip 14 to seal 36 when pressure on cap 40 is released.

Other embodiments of this invention will occur to those skilled in the art which are within the spirit and scope of the following claims.

What is claimed is:

1. An integral molded valve and biasing member for a pressurized container comprising:
    a generally radially extending central body portion having a valving surface on one side thereof;
    an outer support portion adapted for connection to said container, said support portion spaced axially away from said one side of said body portion toward said other side thereof; and an unstressed, resilient, annular web of generally U-shaped cross section having inner and outer annular wall portions integrally connected to said body and support portions and extending away from the sides of said body and support portions opposite said one side, said wall portions being parallel to the axis of said body portion in their undeformed condition;

whereby, on relative movement of said body portion toward said support portion said web is deformed and provides a biasing pressure urging said valving surface in a direction from said other side toward said one side.

2. In a container for pressurized fluid having an opening in one end thereof and an annular seal about said opening on the inner surface of said end, that improvement comprising an integral, prestressed molded valve and biasing member having:

a generally radially extending central body portion extending across said opening and having an annular valving surface on one side thereof in sealing contact with said seal;

an outer support portion fixedly connected to said container; and a deformed resilient annular web of generally U-shaped cross section having inner and outer wall portions integrally connected to said body and support portions and extending away from said portions and from said container end, the inner wall portion of said web deformed to a length shorter than its undeformed condition and the outer wall of said channel deformed to a length longer than its undeformed condition, said wall portions being parallel to the axis of said body portion in their undeformed condition;

whereby said web positively biases said valving surface toward said seal.

3. The improvement claimed in claim 2 in which said support portion is positioned in said container in a plane closer to the plane of said valving surface than the normal position of said support portion, thereby deforming and prestressing said web, said normal position being in a plane spaced toward the other side of said central portion from said plane of said valving surface.

4. The improvement claimed in claim 3 in which said valving surface and said support portion abut a common plane.

5. The improvement claimed in claim 3 further including a valve stem integral with said body portion and extending from said one side, thereof from within the boundaries of said valving surface through said opening.

6. The improvement claimed in claim 5 in which said valving surface is a raised sealing lip.

7. The improvement claimed in claim 3 further including a passage extending into said body portion from a position on the circumferential wall thereof opposite said support portion.

8. The improvement claimed in claim 7 further including a stub portion defining a bore in said body portion extending from the other side thereof to and communicating with said passage.

9. The improvement claimed in claim 8 further including a valve stem integral with said body portion and extending from said one side thereof from within the boundaries of said sealing surface through said opening.

10. The improvement claimed in claim 9 in which said valving surface is a raised sealing lip.

11. The improvement claimed in claim 10 in which said valving surface and said support portion abut a common plane.

References Cited

UNITED STATES PATENTS

| | | | |
|---|---|---|---|
| 3,134,514 | 5/1964 | Booth | 222—494 X |
| 2,478,496 | 8/1949 | Maynard. | |
| 2,681,752 | 6/1954 | Jarrett et al. | 222—402.13 |
| 2,734,773 | 2/1956 | Ivins | 222—402.25 X |
| 2,830,743 | 4/1958 | Rimsha et al. | 222—504 X |
| 2,862,648 | 12/1958 | Cooksley et al. | 222—402.13 X |
| 3,022,039 | 2/1962 | Cone et al. | 251—331 X |
| 3,073,490 | 1/1963 | Dahl et al. | 222—504 X |
| 3,348,742 | 10/1967 | Assalit | 222—394 |

STANLEY H. TOLLBERG, Primary Examiner